Dec. 13, 1960   G. A. LYON   2,964,356
WHEEL COVER
Filed May 22, 1956
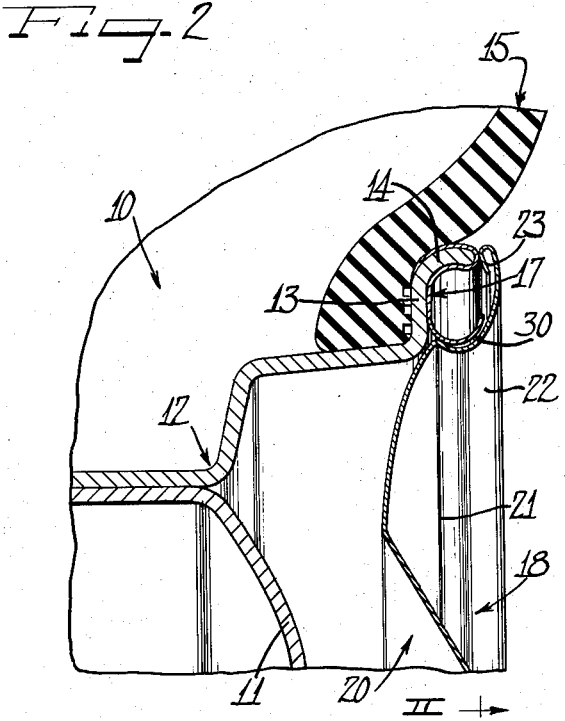
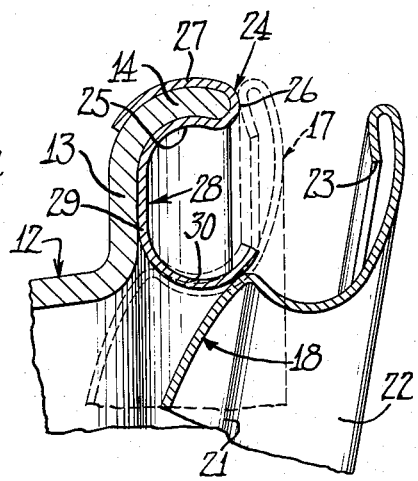
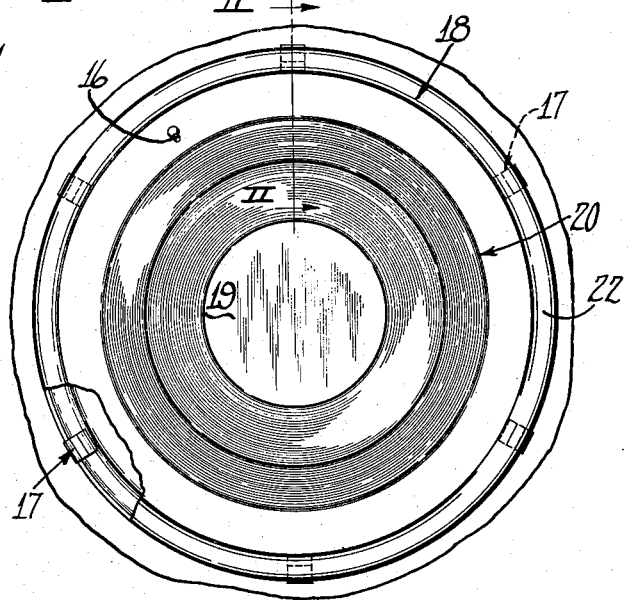
Inventor
George Albert Lyon

United States Patent Office 2,964,356
Patented Dec. 13, 1960

2,964,356

WHEEL COVER

George Albert Lyon, 13881 W. Chicago Blvd., Detroit, Mich.

Filed May 22, 1956, Ser. No. 586,460

3 Claims. (Cl. 301—37)

This invention relates generally to wheel structures and more particularly to a new and improved manner of retaining a cover assembly upon a vehicle wheel.

Presently, there is pressure being brought upon wheel cover manufacturers to reduce the overall cost of their product. To this end, a cover member is provided which may be made from any suitable material such as aluminum or stainless steel and which may be cut from a relatively small blank. Cover retaining means have been provided in the form of resilient spring clips adapted to be self-sustained and enveloped upon a terminal flange of a tire rim. The clip has a flexible shoulder behind which an annular rigid cover shoulder may be retainingly disposed in order for the cover to be carried upon the vehicle wheel.

Accordingly, an object of this invention is to provide a new and improved wheel structure.

Another object of this invention is to provide a multi-part assembly including spring clips and a cover member which clips lend themselves to being self-sustained upon the wheel and are adapted to cooperate with the cover in maintaining the cover in overlying disposition upon the vehicle wheel.

Still another object of this invention is to provide a clip and cover assembly which lend themselves to economical manufacture on a large production basis and enable a reduction in cost.

According to the general features of this invention there is provided in a wheel structure including a wheel having body and rim parts with the rim part having a generally axially extending terminal rim flange, at least one spring clip having a retaining portion in enveloped retained engagement with the terminal rim flange and having a resiliently flexible retaining shoulder, and a cover member in overlying engagement upon the wheel having a generally radially extending outer margin overlying the clip and with the generally radially extending outer margin provided with a relatively rigid continuous annular rib in cover retaining engagement behind the resiliently flexible retaining shoulder on the clip, the retaining portion including a generally axially extending leg having a terminal portion with a portion of a vehicle tire bearing thereagainst holding the terminal portion under tension against the terminal rim flange.

Another feature of the present invention relates to the cover margin being in bottomed engagement against the clip retaining portion to provide a rigid back-up for the retaining engagement between the clip and cover and to resist axial displacement and movement of the retaining portion and clip.

Other objects and features of the present invention will more fully become apparent in view of the following detailed description taken in conjunction with the accompanying drawing illustrating a single embodiment, and in which:

Figure 1 is a side elevation of my wheel structure;

Figure 2 is an enlarged fragmentary cross-sectional view taken substantially on the line II—II of Figure 1 looking in the direction indicated by the arrows; and Figure 3 is an enlarged detail view.

As shown on the drawing:

The reference numeral 10 indicates generally my wheel structure including a body part 11 which lends itself to being attached to an axle of an automobile vehicle or the like by means of threaded lugs extending through the body part 11 and with nuts threaded thereon to clamp the wheel to the vehicle in a conventional manner.

Suitably connected to the body part 11 is a multi-flange dropped center tire rim 12 including a generally radially outward extending flange 13 and an elongated generally axially extending arcuate terminal rim flange 14. Carried upon the wheel and particularly upon the tire rim 12 is a conventional tire assembly 15 which may be either of the tube or tubeless type and lends itself to being inflated by means of a valve stem 16 (Fig. 1).

Carried upon the tire rim 12 and particularly the elongated terminal rim flange 14 is my novel generally S-shaped clip 17 which may be made of any suitable material such as spring steel. As is illustrated in Figure 1, the clips are circumferentially spaced about the tire rim in engagement therewith and are particularly adapted to cooperate with a cover member 18 to maintain the cover member in assembly upon the wheel.

The cover member 18 may be made from any suitable material such as aluminum, stainless steel, or other suitable material which lends itself to a highly lustrous and ornamental appearance after being polished. The cover has a central crown 19 which is bounded at its periphery by an annular dished portion 20. The outer margin of the dished portion 20 terminates in a rigid annular rib 21 defining the inner bounds of outer arcuately looped cover margin 22. The cover margin 22 terminates in a curled under reinforcing pry-off bead 23.

The spring clip 17 is provided with a terminal rim flange gripping or radially outer loop portion 24 which is adapted to envelop and retainingly engage with rim flange 14. The clip portion 24 includes an arcuate generally axially outwardly extending leg portion 25, a generally radially outwardly extending leg portion 26, and a generally axially inwardly arcuate elongated leg portion 27. The portions 25, 26 and 27, when assembled upon the rim flange 14 are adapted to nestingly engage therewith. Preferably, the leg portions 25 and 27 are sprung slightly in opposite directions to one another when in assembly with the rim flange 14 to enable tensioned engagement therewith. In addition, the leg portion 27, has been elongated in order for a portion of the vehicle tire 15 to bear thereagainst to hold the clip under tension against the terminal rim flange.

As will be best seen in Figures 2 and 3, the clip 17 assumes a generally S-shaped cross-sectional configuration and has a radially inner looped portion 28 (Fig. 3). The looped portion 28 is defined by leg portion 25, generally radial leg portion 29 engageably opposing the rim flange 13, and an arcuate radially inwardly bowed radially inner arcuate flexible terminal leg 30 which provides a retaining shoulder behind which the annular rib 21 of the cover member is adapted to be engaged in press-on, pry-off relation. It will be observed that the clip leg portion 25 is common to both of the loop portions 24 and 28 and is engaged against the inside arcuate groove surface of the terminal rim flange 14. By nesting in the groove of the terminal flange 14, the leg portion 25 not only backs up and stiffens the arcuate terminal flexible leg 30 to improve its retaining coaction with the retaining shoulder 21 of the cover member, but the radially outward thrust imparted by the cover shoulder 21 tensions the clip loop portion 28 (as evidenced by the dash outlined condition of Fig. 3) to improve the retaining engagement of the clip leg 25 in the terminal flange groove.

The action of the cover in its assembly upon the clips carried by the wheel is best shown in Figure 3. As the rigid annular shoulder 21 is engaged and forced against the resilient portion 30, the portion 30 is caused to resiliently deflect radially outwardly until the rigid shoulder 21 snaps therebehind with the beaded cover terminal 23 in bottomed engagement against the clips 17. During snapping on of the cover the clip leg 29 by its engagement with the rim flange 13 limits axially inward deflection of the clip loop 28 and more particularly the cover retaining terminal leg 30. To remove the cover from the wheel, a suitable pry-off tool may be worked between the tire rim flange 14 and the beaded cover terminal 23 until the rigid shoulder 21 is disengaged from the clips 17.

If desired, prior to the assembly of the clips on the wheel, a wheel balancing weight (not shown), may be inserted in the generally radially outwardly opening recess provided by the looped portion 28 of the clip and with the resilient clip leg portion 30 being stressed slightly radially inwardly in order to permit tensioned engagement of the wheel balancing weight. Clips carrying wheel balancing weights will not be as flexible as those that do not carry the weights. The clips 17 may be assembled upon the terminal flange by aligning and slightly springing the leg portions 25 and 27 apart to allow the looped portion 24 to be slipped over the terminal flange 14 in tensioned engagement therewith.

Removal of the clips 17 may be brought about by prying them from the terminal rim flange with a suitable pry-off tool.

It will be understood that variations and modifications may be effected without departing from the scope of the novel concepts of my invention.

I claim as my invention:

1. In a wheel structure including a wheel having a multi-flanged tire rim including a generally radial flange with an axially outwardly curved terminal, spring clips retainingly hooked over said curved terminal and each of which includes a first portion curved complemental to and nested snugly inside of and against said terminal, a radially extending portion bottomed firmly against said radial flange and a resilient convexly curved portion extending freely and generally axially outwardly from said radial rim flange in radially spaced relation to said first clip portion, and a wheel cover member having a radially outer ring-like portion for overlying and concealing said clips and provided with a generally axially extending concave annular portion transversely curved complemental to that of said clip convexly curved portions, said annular portion having a radius slightly greater than the spacing of the convexly curved portions of the clips from the center of the wheel so that upon engagement by the clips said clip convexly curved portions will be resiliently cammed radially outwardly until same are resiliently nested in the concave annular portion of said cover member for retaining the cover member on the wheel.

2. In a wheel structure including a tire rim having a terminal flange with generally radially extending and axially extending joined parts, retaining clips carried by the axially extending part of the terminal flange and having loops overlying the radially extending terminal flange part, a cover for disposition at the outer side of the wheel having a marginal circular portion for overlying the terminal flange and the clips and providing therewith a substantial chamber within which wheel weights are adapted to be accommodated, said circular portion having spaced radially inwardly from the edge thereof radially projecting and axially outwardly facing cover retaining shoulder structure engageable behind the clip loops for retaining the cover on the wheel.

3. In a wheel structure including a tire rim having a terminal flange including a radially outwardly extending and axially outwardly facing portion leading into a generally axially outwardly extending and radially inwardly facing lip portion providing a generally radially inwardly opening groove, a circumferentially spaced series of cover retaining spring clips each of which has a terminal lip flange gripping loop and a radially inner cover retaining loop which overlies the radially extending terminal flange portion, said clip loops having a common leg which is curved to fit in complementally conformable relation retainingly within said groove, said cover retaining clip loop in each instance including a radially inner portion providing on the radially inner side thereof a generally radially and axially inwardly facing shoulder opposing the radially innermost portion of said radially extending terminal flange portion, and a cover member having an outer marginal portion for overlying the terminal flange and provided with retaining shoulder means thereon engaging said clip shoulders and thereby effecting radially outward yielding of said radially inner cover retaining loop portion and strong resilient radially outward reaction toward said common clip leg into said groove for enhancing the gripping of the common clip leg by firm back-up thereof into the groove.

References Cited in the file of this patent

UNITED STATES PATENTS

| | | |
|---|---|---|
| 2,137,416 | Rubsam | Nov. 22, 1938 |
| 2,351,655 | Aske | June 20, 1944 |
| 2,361,406 | Lyon | Oct. 31, 1944 |
| 2,569,483 | Lyon | Oct. 2, 1951 |
| 2,749,184 | Wood | June 5, 1956 |